United States Patent [19]
Palmroos et al.

[11] Patent Number: 6,096,837
[45] Date of Patent: Aug. 1, 2000

[54] METHOD FOR PREVENTING FOULING AND SHEETING IN GAS PHASE REACTORS

[76] Inventors: Ari Palmroos, Haltiakuja 4 F 19, FIN-04230 Kerava; Arno Avela, Kotasuontie 12 B, 00680 Helsinki; Auli Nummila-Pakarinen, Purotie 10-12, FIN-06400 Porvoo; Kari Matilainen, Oravanmarjapolku 4, 06100 Porvoo, all of Finland

[21] Appl. No.: 08/945,225

[22] PCT Filed: Apr. 10, 1996

[86] PCT No.: PCT/FI96/00189

§ 371 Date: Jan. 9, 1998

§ 102(e) Date: Jan. 9, 1998

[87] PCT Pub. No.: WO96/32420

PCT Pub. Date: Oct. 17, 1996

[30] Foreign Application Priority Data

Apr. 12, 1995 [FI] Finland ................................... 951779

[51] Int. Cl.$^7$ ........................................................ C08F 2/00
[52] U.S. Cl. .......................... 526/64; 526/65; 526/74; 526/904; 526/201; 525/242; 525/243
[58] Field of Search ................................. 525/242, 243, 525/52, 53; 526/64, 65, 74, 904

[56] References Cited

U.S. PATENT DOCUMENTS

| | | | |
|---|---|---|---|
| 3,956,252 | 5/1976 | Saeda et al. | 526/74 |
| 3,995,097 | 11/1976 | Brown et al. | 526/74 |
| 4,012,574 | 3/1977 | Jones et al. | 526/74 |
| 4,068,054 | 1/1978 | Willcox | 526/74 |
| 4,182,810 | 1/1980 | Willcox | 526/64 |
| 4,259,087 | 3/1981 | Naiman et al. | 44/62 |
| 4,740,550 | 4/1988 | Foster et al. | 525/52 |
| 5,283,278 | 2/1994 | Daire et al. | 524/399 |
| 5,326,835 | 7/1994 | Ahvenainen et al. | 526/64 |
| 5,684,097 | 11/1997 | Palmroos et al. | 526/64 |

FOREIGN PATENT DOCUMENTS 0453116  10/1991  European Pat. Off. .

*Primary Examiner*—David W. Wu
*Assistant Examiner*—Roberto Rabago

[57] ABSTRACT

A method for preventing sheeting problems in a gas phase reactor in such multi-phase polymerization process, which comprises at least one loop reactor followed by a gas phase reactor, where the polymerization is continued in the presence of added monomers, and in which process a fouling preventive agent is used to prevent fouling or sheeting in the reactors. According to the invention 30–70% of the end product is polymerized in the loop reactor, where the whole amount of the fouling preventive agent is added, the amount of the fouling preventive agent being higher than necessary to prevent the fouling in the loop reactor.

18 Claims, No Drawings

METHOD FOR PREVENTING FOULING AND SHEETING IN GAS PHASE REACTORS

BACKGROUND OF THE INVENTION

The invention concerns a method for preventing fouling and sheeting in polymerization reactors, particularly in gas phase reactors of multiphase polymerization processes.

Various methods for manufacturing solid polymers from hydrocarbons, for example from 1-olefins have been developed. In one such method olefins, such as ethylene, propylene or butene, are polymerized in the presence of catalysts in hydrocarbon diluents or in monomers acting as diluents. The reactants are kept in liquid phase by maintaining a proper pressure in the polymerization reactor. When the polymer is insoluble or only slightly soluble in the diluent, the polymer product forms as particles and therefore the product flow consists of a suspension formed by polymer particles, diluents and monomers.

One reactor type applied in such methods is a continuous pipe reactor forming a loop, where the polymerization is carried out in a circulating turbulent flow. The product containing polymer, diluent and monomers, is taken from the loop reactor either continuously, or more usually, periodically through a discharge valve and it is introduced to a separator, where the polymer is separated by lowering the pressure.

Another reactor type applied in such methods is a gas phase reactor, where polymerization is carried out in the presence of catalysts and gaseous monomers. Typically the polymerization is carried out in fluidized bed reactors, where polymerization is carried out in a bed formed by polymerizing polymer particles. This bed is kept in fluidized state by circulating gaseous flow from the top of the reactor to the bottom of the reactor. Polymerization heat is removed by cooling said circulating gaseous flow.

It is also known continuous multiphase processes, where slurry reactors, such as loop reactors are followed by one or more gas phase reactors.

One problem, which frequently is found especially in loop reactors, is the adhering of the polymer particles onto the reactor walls. Even slight amounts of polymer cause that the smoothness of the reactor inside surface disappears, whereafter the adhering starts to accelerate and causes in the worst case the blocking of the reactor. A polymer layer on the reactor surface actually increases the flow resistance of the polymer suspension and the pumping power required. At the same time die heat transfer efficiency of the reactor decreases and makes the temperature control more difficult. If high polymerization temperatures are used, the result can be melting of the polymer.

Also in gas phase reactors similar problems can be found. The polymer particles tend to adhere to the reactor surfaces and reactor internals and also polymer particles tend to adhere to each other and form lumps. This will cause flow disturbances in the fluidized bed and local overheating because polymerization heat cannot be effectively removed from larger polymer lumps. Especially polymer sheets adhering on reactor walls and later detaching cause severe problems in the product quality.

The harmful fouling phenomena described above has been tried to be avoided by adding into diluent antistatic agents, which make the diluent more conductive and thereby prevent at least somewhat the formation of Static electric charges. However these kind of antistatic agents are usually harmful for polymerization catalyst, because they act at least in some degree as catalyst poisons and thereby decrease catalyst activity. Therefore, the amounts of known fouling preventive agents must generally be rather low. Similarly various antistatic compounds have been tried also in gas phase reactors to decrease sheeting problems.

In U.S. Pat. No. 3,956,252 it has been proposed as antistatic agent a nitrogen containing salt of phytic acid or a mixture of it with an alkali metal salt of an organic acid.

In U.S. Pat. No. 3,995,097 it has been proposed as antistatic agent a mixture of an aluminum or chromium salt of an alkyl salicylic acid and an alkali metal alkyl sulfosuccinate.

In U.S. Pat. No. 4,012,574 it has been prosed as antistatic agent a surface-active compound, which contains one or more perfluorocarbon groups.

In U.S. Pat. No. 4,068,054 it has been proposed as antistatic agent a porphyrine compound either alone or together with a metal alkyl sulfosuccinate.

SUMMARY OF THE INVENTION

In U.S. Pat. No. 4,182,810 it has been prosed as antistatic agent a mixture of a polysulphone polymer, a polymeric polyamine and an oil-soluble sulphonic acid.

From Finnish patent application F1911712 a gas phase process is known, where a prepolymer treated with an antistatic agent is used as catalyst. The catalyst is prepared according to the publication by polymerizing a little amount of monomer into the catalyst. In order to improve the flow properties of the catalyst and to decrease sheeting in the gas phase polymerization an antistatic agent is added to the catalyst.

Thus it is essentially a one-step process (gas phase) not comparable with the multistep process of the present application where in loop polymerization step an amount of several ten-folds of polymer per catalyst is polymerized. The necessary catalyst activity before gas phase reactor is very small, because only slight amount of monomer is polymerized into the catalyst. Hence, the antistatic agent is not harmful in the prepolymerization by slurry process.

The present invention is related to preventing sheeting problems in gas phase reactors in such polymerization processes, which comprise at least one loop reactor followed by at least one gas phase reactor. By using typical prior art fouling preventing agents in loop reactor it is possible to add only a limited amounts of fouling preventive agents because higher amounts would decrease the catalyst activity and therefore the productivity. In order to avoid sheeting problems in the gas phase reactor, it would be necessary to add fouling or sheeting preventive agents also to gas phase reactor. Because the polymerization environments in loop reactors and in gas phase reactors are quite different, it would be often necessary to use different types of antistatic agents in loop and gas phase reactors. Also, higher amounts of antistatic agents are usually necessary in gas phase reactors.

The object of the invention is to provide a method to prevent the harmful sheeting problems in a gas phase polymerization reactor, which is preceded with one or more loop reactors, where a considerable amount of the polymer forming the end product is polymerized. One object of the invention is to eliminate the need to add catalyst activity retarding antistatic agents into the gas phase reactor and in the same time to avoid the harmful sheeting problems. A further object of the invention is to improve the stability of the process by avoiding the use of additional activity effecting chemicals in the reactor.

The reactor conditions in loop reactors and gas phase reactors are quite different. According to the invention, however, it has been surprisingly found that it is possible to add certain fouling preventive agents into a loop reactor in greater amounts than needed for fouling prevention and that sufficient amounts of these agents are transferred into the gas phase reactor with the product of loop reactor to prevent also harmful sheeting problems in gas phase reactor. Thus, the whole amount of the fouling preventive agent is added into the loop reactor or loop reactors. No fouling preventive agent is added into the gas phase reactor.

When the liquid polymerization medium is partly or totally removed from the product flow of the loop reactor before feeding it into the gas phase reactor, it is essential that the boiling point of the fouling preventive agent is higher than that of the hydrocarbon diluent applied in the loop reactor. Thus the essential part of the fouling preventive agent remains in the polymer particles during the during the diluent removal step, which typically is carried out by flashing.

In the experiments made it has been found that one usable fouling preventive agent according to the invention is, a mixture of Cr salt of $C_{14}$–$C_{18}$ alkyl-salicylic acid, a Ca dialkyl sulphosuccinate and a copolymer of alkylmethacrylate with 2-methyl-5-vinylpyridine in solution in xylene. This is believed to correspond a commercial antistatic agent ASA-3 (R). According to the examples small amounts of this antistatic added into the loop reactor cannot prevent the building of sheeting problems in gas phase reactor, but when higher amounts are used, the sheeting problems are smaller or absent. Also higher amounts of this antistatic agent added into the gas phase reactor only do not prevent tie sheeting sufficiently.

One even more suitable fouling preventive agent according to the invention is a composition of an alphaolefin-acrylonitrile copolymer and a polymeric polyamine is especially suitable to prevent polymer particles from adhering onto loop reactor walls, because it does not essentially decrease catalyst activity. Therefore even higher amounts of this antistatic agent can be used without essentially decreasing the catalyst activity.

The compositions formed by alpha-olefin-acrylonitrile copolymers and a polymeric polyamines are as such known and also the application of them as antistatic agents. Thus, for example according to U.S. Pat. No. 4,259,087 these compositions are used in small amounts in hydrocarbon fuels to decrease ignition and explosion hazards due to electrostatic charges. Other usages proposed in this patent are solvents, spot removers such as naphta cleaners, textiles, pigments, liquid polishing agents and rubber compositions.

The fouling preventive agents applied in the invention consist of a composition, which contains alphaolefin-acrylonitrile copolymer and polyamine. Said copolymers can be manufactured, as disclosed in U.S. Pat. No. 4,259,087, by complexing acrylonitrile with a Lewis-acid, such as $AlCl_3$, $ZnCl_2$ and $AlR_nCl_3$, and by polymerizing the complex obtained with a terminal olefin with the aid of a free radical initiator. Suitable alphaolefins are, for example, 1-hexene, 1-octene, 1-decene, 1-dodecene, tetradecene, 1-hexadecene and eicosene.

Polyamine components can also be prepared by known way for example by polymerizing aliphatic primary mono or diamines with epichlorhydrine or an alphaolefin-maleic acid anhydride copolymer.

Generally the ratio of the alphaolefin-acrylonitrile copolymer to polyamine component can be varied within wide limits, for example from 1:99 to 99:1, preferably from 25:75 to 75:25.

The amount of the fouling agent used according to the invention can be varied from 0.001 to 3 g/g catalyst, preferably from 0.01 to 0.7 gig catalyst or 8–500 ppm, preferably 10–50 ppm based on the diluent flow added into the loop reactor. Especially it is to be noted that the amount of the fouling agent according to the invention can be exceptionally high without harmful effect on catalyst activity. This is especially advantageous in the multiphase polymerization process according to the invention, because excess amounts of fouling prevention agent must be used in order to achieve the desired effect in the gas phase reactor. The minimum amount of the fouling preventive agent is selected so that the sheeting formation in the gas phase reactor will be lowered to an acceptable level or it will be removed completely. The proper amount can be found by experimenting or following the sheet formation and increasing the feed of the fouling preventive into the loop reactor, when necessary.

The fouling prevention agent according to the invention can be added before the loop reactor into some feed flow going into the reactor or straight to the reactor. Thus, it can be added into the diluent or monomer feed flow of the loop reactor or into the diluent used for feeding the catalyst The addition can be carried out either continuously or batchwise or only when sheeting problems arise in the gas phase reactor.

The fouling prevention agent according to the invention can be applied especially in the polymerization or copolymerization of alphaolefins, such as ethylene, propylene, 4-methyl-1-pentene or hexene either in processes comprising at least loop reactor followed by at least one gas phase reactor. Most preferably it is applied in ethylene, propylene or butene polymerizations or copolymerizations in loop and gas phase reactors. Especially the fouling prevention agent according to the invention is applied, when as catalyst is used catalyst sensitive to catalyst poisoning, such as chromium-type catalysts, Ziegler-type catalysts or metallocene-type catalysts.

Thus as catalysts it can be used for example chromium catalysts, which typically comprise chromium oxide supported on inorganic carrier, such as silica, alumina and zirconia. Ziegler-Natta catalysts comprise generally one or more transition metals belonging to groups IV–VI of the Periodic Table, such as titanium, vanadium, zirconium or chromium, and of an organometallic compound of metals belonging to groups I–III of The Periodic Table. Metallocene catalysts typically are formed from a metallocene compounds of transition metals, such as zirconium or hafnium, and an alumoxane as a homogeneous system or supported on inorganic or organic carrier material.

In the polymerization it is applied generally temperatures of 40–110° C. and pressures of 1–100 bar. The first polymerization reactor can be a conventional pipe reactor, preferably a loop reactor, and the second reactor can be any conventional gas-phase reactor. It is also possible to use two or more loop reactors in series before the gas phase reactor. It is essential that a considerable amount, i.e. 30–70%, preferably 40–60% of the end product is polymerized in the loop reactor(s).

In slurry polymerization aliphatic hydrocarbons, such as propane, butane, pentane or hexane can be used as diluent, although the use of the fouling preventive agent according to the invention is not limited only to the examples listed.

DETAILED DESCRIPTION OF THE INVENTION

In the following the invention is illustrated by examples, in which as fouling prevention agents the following commercial products were used:

TOLAD 511 (a composition of alphaolefin-acrylonitrile copolymer and polymeric polyamine, manufactured by Petrolite Corp.)

ASA 3 (a solution in xylene of chromium and calcium organic salts stabilized with a polymer, manufactured by Shell)

In all polymerizations the solvent applied in the loop reactor was removed at least partly by flashing before transferring the product into the gas phase reactor.

EXAMPLE 1

A loop reactor having a volume of 500 dm$^3$ was operated at 95° C. by feeding continuously 25 kg/h propane, 24.5 g/h polymerization catalyst containing 3% titanium as an active metal, ethylene so that its content in the liquid phase was 8.1 mol-% and hydrogen so that its ratio to ethylene in the reactor was 380 mol/kmol. To remove the static electricity, a solution of Tolad 511 in propane was continuously added into the reactor, calculated as 288 mg of pure Tolad per hour, corresponding 11 ppm of Tolad in the reactor diluent. Tolad was completely dissolved in propane, no heating of the feed drum or pipe was required.

Polyethylene having MFR$_2$ of 310 g/10 min was withdrawn continuously from the reactor with a rate of 26 kg/h. The amount of TOLAD in the polymer was 11 ppm by weight and the amount of titanium 28 ppm by weight. The polymer was then introduced into a gas-phase reactor operating at 75° C. and 14.4% ethylene content. The hydrogen to ethylene and 1-butene to ethylene ratios in the gas phase reactor were 104 mol/kmol and 21 mol/kmol, respectively. Polyethylene was withdrawn from the gas phase reactor with a rate of 64 kg/h. The polymer was free of static electricity and no sheeting or chunking was observed in the gas phase reactor.

EXAMPLE 2

A loop reactor having a volume of 500 dm$^3$ was operated at 95° C. by feeding continuously 31.5 kg/h propane., 8.3 g/h polymerization catalyst containing 3% titanium as an active metal, ethylene so that its content in the liquid phase was 6.5% by mole and hydrogen so that its ratio to ethylene in the reactor was 165 mol/kmol. To remove the static electricity, a solution of Tolad 511 in propane was continuously added into the reactor, calculated as 567 mg of pure Tolad per hour, corresponding 20 ppm of Tolad in the reactor diluent. Tolad was completely dissolved in propane, no heating of the feed drum or pipe was required.

Polyethylene having MFR$_2$ of 43 g/10 min and density of 970 g/dm$^3$ was withdrawn continuously from the reactor with a rate of 21.9 kg/h. The amount of TOLAD in the polymer was 25 ppm by weight and the amount of titanium 11 ppm by weight. The polymer was then introduced into a gas-phase reactor operating at 70° C. and 27.1% ethylene content. The hydrogen to ethylene and 1-butene to ethylene ratios were 131 mol/kmol and 184 mol/kmol, respectively. Polyethylene was withdrawn from the gas phase reactor with a rate of 61.5 kg/h. The polymer was free of static electricity and no sheeting or chunking was observed in the gas phase reactor. The MFR$_{21}$ of the polymer was 66 g/10 min. The density of the product was 938.6 g/dm$^3$.

EXAMPLE 3

A loop reactor having a volume of 500 dm$^3$ was operated at 95° C. by feeding continuously 37 kg/h propane, 4 g/h polymerization catalyst containing 0.19% titanium as an active metal, ethylene so that its content in the liquid phase was 7% by mole and hydrogen so that its ratio to ethylene in the reactor was 370 mol/kmol. To remove the static electricity, a solution of Tolad 511 in propane was continuously added into the reactor, calculated as 740 mg of pure Tolad per hour, corresponding 20 ppm of Tolad in the reactor diluent. Tolad was completely dissolved in propane, no heating of the feed drum or pipe was required.

Polyethylene having MFR$_2$ of 125 g/10 min and density of 971 g/dm$^3$ was withdrawn continuously from the reactor with a rate of 30 kg/h. The polymer, which contained 25 ppm by weight of Tolad and 11 ppm by weight of Ti, was then introduced into a gas-phase reactor operating at 75° C. and 21.6% ethylene content. The hydrogen to ethylene and 1-butene to ethylene ratios were 100 mol/kmol and 20 mol/kmol, respectively. Polyethylene was withdrawn from the gas phase reactor with a rate of 60 kg/h. The polymer was free of static electricity and no sheeting or chunking was observed in the gas phase reactor.

EXAMPLE 4 (COMPARATIVE)

A loop reactor having a volume of 500 dm$^3$ was operated at 95° C. by feeding continuously 25 kg/h propane. 27 g/h polymerization catalyst containing 3% titanium as an active metal, ethylene so that its content in the liquid phase was 8 mol-% and hydrogen so that its ratio to ethylene in the reactor was 300–450 mol/kmol. To remove the static electricity, 50 mg of an fouling preventive agent, ASA-3 was continuously introduced into the reactor. The amount of the fouling preventive corresponded 2 ppm of ASA-3 in the reactor diluent. Polyethylene was withdrawn continuously from the reactor with a rate of 25 kg/h. The polymer, which contained 2 ppm by weight of ASA-3 and 30 ppm by weight of Ti, was then introduced into a gas-phase reactor operating at 75° C. and 30% ethylene content. The hydrogen to ethylene and 1-butene to ethylene ratios in the gas phase reactor were 140 mol/kmol and 3 mol/kmol respectively. Polyethylene was withdrawn from the gas phase reactor with a rate of 63 kg/h. After a short period of steady operation, the process was shut down due to sheet formation in the gas phase reactor.

EXAMPLE 5 (COMPARISON)

A loop reactor having a volume of 500 dm$^3$ was operated at 95° C. by feeding continuously 25 kg/h propane, 24 g/h polymerization catalyst containing 3% titanium as an active metal, ethylene so that its content in the liquid phase was 7–8 mol-% and hydrogen so that its ratio to ethylene in the reactor was 300–500 mol/kmol. To remove the static electricity, 50 mg of an fouling preventive agent, ASA-3 was continuously introduced into the reactor. The amount of the fouling preventive corresponded 2 ppm of ASA-3 in the reactor diluent. Polyethylene was withdrawn continuously from the reactor with a rate of 26 kg/h. The polymer, which contained 2 ppm by weight of ASA and 28 ppm by weight of Ti, was then introduced into a gas-phase reactor operating at 75° C. and 20% ethylene content. The hydrogen to ethylene and i-butene to ethylene ratios in the gas phase reactor were 104 mol/kmol and 21 mol/kmol respectively. In addition, an fouling preventive agent (ASA-3) was continuously added directly into the gas phase reactor with a feed rate of approximately 200 mg of pure ASA per hour. Polyethylene was withdrawn from the gas phase reactor with a rate of 64 kg/h. During the run the chunk and especially sheet formation in the gas phase reactor was a problem. Due to this reason the gas phase reactor was forced to shut down after a short running period. Several runs were attempted, the longest one lasting approx. 80 hours

EXAMPLE 6

A loop reactor having a volume of 500 dm$^3$ was operated at 95° C. by feeding continuously 25 kg/h propane, 17 g/h polymerization catalyst containing 3% titanium as an active metal, ethylene so that its content in the liquid phase was 9 mol-% and hydrogen so that its ratio to ethylene in the reactor was 500 mol/kmol. To remove the static electricity 200 mg/h of an fouling preventive agent, ASA-3, corresponding 8 ppm of ASA in the reactor diluent, was continuously introduced into the reactor. Polyethylene was withdrawn continuously from the reactor with a rate of 23 kg/h. The polymer, which contained 9 ppm by weight of ASA and 22 ppm by weight of Ti, was then introduced into a gas-phase reactor operating at 75° C. and 12% ethylene content. The hydrogen to ethylene and 1-butene to ethylene ratios in the gas phase reactor were 100 mol/kmol and 34 mol/kmol respectively. Polyethylene was withdrawn from the gas phase reactor with a rate of 53 kg/h. No sheet or chunk formation was observed during the run, and the operation could be continued without a shut-down for two weeks.

We claim:

1. A method for preventing sheeting problems in a gas phase reactor in a multi-phase polymerization process, which comprises one or more loop reactors, where alpha-olefins are polymerized or copolymerized in particle form in the presence of catalysts and which loop reactor(s) is followed by a gas phase reactor, where the polymerization is continued in the presence of added monomers, and in which process a fouling preventive agent is used to prevent fouling or sheeting in the reactors, characterized in that 30–70% of the end product is polymerized in the loop reactor(s), where the whole amount of the fouling preventive agent is added into the loop reactor and that the amount of the fouling preventive agent is higher than necessary to prevent the fouling in the loop reactor.

2. A method according to claim 1 further comprising a diluent in the loop reactor, wherein the fouling preventive agent has a boiling point which is higher than the boiling point of the diluent.

3. A method according to claim 1 further comprising a diluent in the loop reactor, wherein the concentration of the fouling preventive agent in the diluent is 8–500 ppm.

4. A method according to claim 1, characterized in that the fouling preventive is a composition of alphaolefin-acrylonitrile copolymers and polymeric polyamines.

5. A method according to claim 4, characterized in that said polyamine is a polymerization product of an aliphatic primary mono or diamine with epichlorhydrine or an alpaolefin-maleic acid anhydride copolymer.

6. A method according to claim 4, characterized in that the ratio of the alphaolefin-acrylonitrile copolymer to polyamine component is from 1:99 to 99:1.

7. A method according to claim 1, characterized in that said fouling preventive agent is a mixture of Cr-salt of $C_{14}$–$C_{18}$ alkyl-salicylic acid, a Ca-dialkylsulphosuccinate and a copolymer of an alkyl methacrylate with 2-methyl-5-vinylpyridine in solution in xylene.

8. A method according to claim 1, wherein the amount of said fouling preventive composition is 0.001–3 g/g catalysts.

9. A method according to claim 1, characterized in that said alpha-olefin polymerized in said reactor is selected from ethylene, propylene, 1-butene, 1-hexene, octene or a mixture thereof.

10. A method for preventing sheeting problems in a gas phase reactor of a multi-phase polymerization process which includes one or more loop reactors where alpha-olefins are polymerized or copolymerized in particle form in the presence of catalysts and in which said one or more loop reactors is followed by a gas phase reactor where polymerization is continued in the presence of added monomers and wherein said multi-phase polymerization process includes a fouling preventive agent to prevent fouling or sheeting in the reactors which comprises the steps of:

(a) polymerizing or copolymerizing an alpha-olefin in particle form in the presence of catalysts in a loop reactor and continuously adding a fouling preventive agent in an amount greater than the amount necessary to prevent fouling in said loop reactor;

(b) continuing said polymerizing or copolymerizing of said alpha-olefin from step (a) in the presence of added monomers in a gas phase reactor;

wherein from 30% to 70% of said alpha-olefin is polymerized or copolymerized in said loop reactor of step (a).

11. A method for preventing sheeting problems in a multi-phase polymerization process in a gas phase reactor according to claim 10, wherein said step of polymerizing or copolymerizing an alpha-olefin in particle form in the presence of catalysts in a loop reactor occurs in the presence of a diluent, and wherein said fouling preventive agent has a boiling point which is higher than the boiling point of said diluent.

12. A method for preventing sheeting problems in a multi-phase polymerization process in a gas phase reactor according to claim 11, wherein said fouling preventive agent is added in the amount of from 8–500 ppm of said diluent used in said loop reactor.

13. A method for preventing sheeting problems in a multi-phase polymerization process in a gas phase reactor according to claim 10, wherein said fouling preventive agent comprises an alpha-olefin-acrylonitrile copolymer and a polymeric polyamine.

14. A method for preventing sheeting problems in a multi-phase polymerization process in a gas phase reactor according to claim 13, wherein said polymeric polyamine is a polymerization product of an aliphatic primary mono or diamine with epichlorhydrine or an alpha-olefin-maleic acid anhydride copolymer.

15. A method for preventing sheeting problems in a multi-phase polymerization process in a gas phase reactor according to claim 10, wherein said fouling preventive agent comprises a Cr-salt of $C_{14}$–$C_{18}$ alkyl-salicylic acid, a Ca-dialkylsulphosuccinate and a copolymer of an alkyl methacrylate with 2-methyl-5-vinylpyridine in solution in xylene.

16. A method for preventing sheeting problems in a multi-phase polymerization process in a gas phase reactor according to claim 10, wherein said alpha-olefin is selected from the group consisting of ethylene, propylene, 1-butene, 1-hexene, octene or a mixture thereof.

17. A method according to claim 4, characterized in that the ratio of the alphaolefin-acrylonitrile copolymer to polyamine component is from 25:75 to 75:25.

18. A method according to claim 1, characterized in that the amount of said fouling preventive composition is 0.01–0.7 g/g catalyst.

* * * * *

UNITED STATES PATENT AND TRADEMARK OFFICE
CERTIFICATE OF CORRECTION

PATENT NO. : 6,096,837

DATED : August 1, 2000

INVENTOR(S) : Palmroos, Ari et al

It is certified that error appears in the above-identified patent and that said Letters Patent is hereby corrected as shown below:

On the Title Page, Item [73] Assignee should read ----- Borealis Polymers Oy -----.
On the Title Page, Item [75] the second inventors address should read
------ Pyörökiventie 10 D, FIN-00830 Helsinki, Finland -----.
On the Title Page, insert the Attorney, Agent, or Firm as – Steinberg & Raskin, P.C.---.

Signed and Sealed this

Twenty-ninth Day of May, 2001

*Attest:*

NICHOLAS P. GODICI

*Attesting Officer*  *Acting Director of the United States Patent and Trademark Office*